US012683888B2

(12) United States Patent
Gillings

(10) Patent No.: US 12,683,888 B2
(45) Date of Patent: Jul. 14, 2026

(54) SYSTEMS AND METHODS FOR AUTOMATICALLY TESTING A NETWORK SWITCH

(71) Applicant: Communications Test Design, Inc., West Chester, PA (US)

(72) Inventor: Daniel Philip Gillings, Downingtown, PA (US)

(73) Assignee: Communications Test Design, Inc., West Chester, PA (US)

( * ) Notice: Subject to any disclaimer, the term of this patent is extended or adjusted under 35 U.S.C. 154(b) by 289 days.

(21) Appl. No.: 18/686,855

(22) PCT Filed: Nov. 4, 2022

(86) PCT No.: PCT/US2022/048929
§ 371 (c)(1),
(2) Date: Feb. 26, 2024

(87) PCT Pub. No.: WO2023/081337
PCT Pub. Date: May 11, 2023

(65) Prior Publication Data
US 2024/0356831 A1      Oct. 24, 2024

Related U.S. Application Data

(60) Provisional application No. 63/275,672, filed on Nov. 4, 2021.

(51) Int. Cl.
*H04L 43/50*      (2022.01)
*H04L 12/10*      (2006.01)
(52) U.S. Cl.
CPC .............. *H04L 43/50* (2013.01); *H04L 12/10* (2013.01)

(58) Field of Classification Search
CPC ................................ H04L 43/50; H04L 12/10
See application file for complete search history.

(56) References Cited

U.S. PATENT DOCUMENTS 7,627,398 B1 * 12/2009 Bennett ................... H04L 12/10
                                                              700/297
9,008,112 B1      4/2015 Lee et al.
(Continued)

FOREIGN PATENT DOCUMENTS

CN        105141480 A      12/2015
CN        105337795 A  *  2/2016   ............. H04L 43/50
(Continued)

OTHER PUBLICATIONS

Extended European Search Report issued for European Patent Application No. 22890810.9 dated Aug. 11, 2025, 15 pages.
(Continued)

*Primary Examiner* — Congvan Tran
(74) *Attorney, Agent, or Firm* — Duane Morris LLP

(57) ABSTRACT

Systems and methods for automatically testing a network switch are disclosed according to various embodiments. In one example, a method for automatically and simultaneously testing Power over Ethernet (PoE) ports and traffic throughput of a network switch is disclosed. A data traffic is generated by a network tester with a predetermined speed based on a configuration of the network switch. The data traffic is directed through the PoE ports of the network switch. At least one PoE tester connected to the network switch via the PoE ports of the network switch is configured, e.g. by a test application running on a test computer. A first result of testing the PoE ports is obtained by the test computer from the at least one PoE tester. A second result of testing the traffic throughput of the network switch is obtained by the test computer from the network tester.

13 Claims, 7 Drawing Sheets

(56)                    References Cited

U.S. PATENT DOCUMENTS

| | | | |
|---|---|---|---|
| 9,401,760 B2 | 7/2016 | Skirmont et al. | |
| 2013/0266307 A1 | 10/2013 | Garg et al. | |
| 2014/0310604 A1* | 10/2014 | Kahkoska | H04L 43/50 |
| | | | 715/736 |
| 2018/0191591 A1* | 7/2018 | Marcus | H04L 43/0811 |
| 2018/0238971 A1* | 8/2018 | Bennett | G01R 31/40 |
| 2021/0203516 A1* | 7/2021 | Eghbal | H04L 12/10 |
| 2021/0263111 A1* | 8/2021 | Magno | G01R 1/067 |
| 2022/0217547 A1* | 7/2022 | Yeatts | G06F 9/541 |
| 2022/0321317 A1* | 10/2022 | Barker | H04L 5/1438 |

FOREIGN PATENT DOCUMENTS

| | | | | | |
|---|---|---|---|---|---|
| CN | 109756400 A | | 5/2019 | | |
| CN | 113992554 A | * | 1/2022 | | H04L 49/10 |
| CN | 114968677 A | * | 8/2022 | | G06F 9/505 |

OTHER PUBLICATIONS

Examination Report for corresponding Australian Patent Application No. 2022380930 dated Oct. 17, 2024, 2 pages.

Office Action for corresponding Canadian Patent Application No. 3,231,517 dated Mar. 7, 2025, 3 pages.

International Search Report and Written Opinion for PCT International Application No. PCT/US2022/048929 issued on Mar. 8, 2023, 8 pages.

\* cited by examiner

200

SFP2: Traffic Loops Back To Port 23 Via VLAN.

SFP1 Connected To 170 Which Counts Number Of Packets Sent And Received

Traffic Is Sent Back To 170 From Port 1 To SFP1 Via VLAN 300-1

300-2

_500_

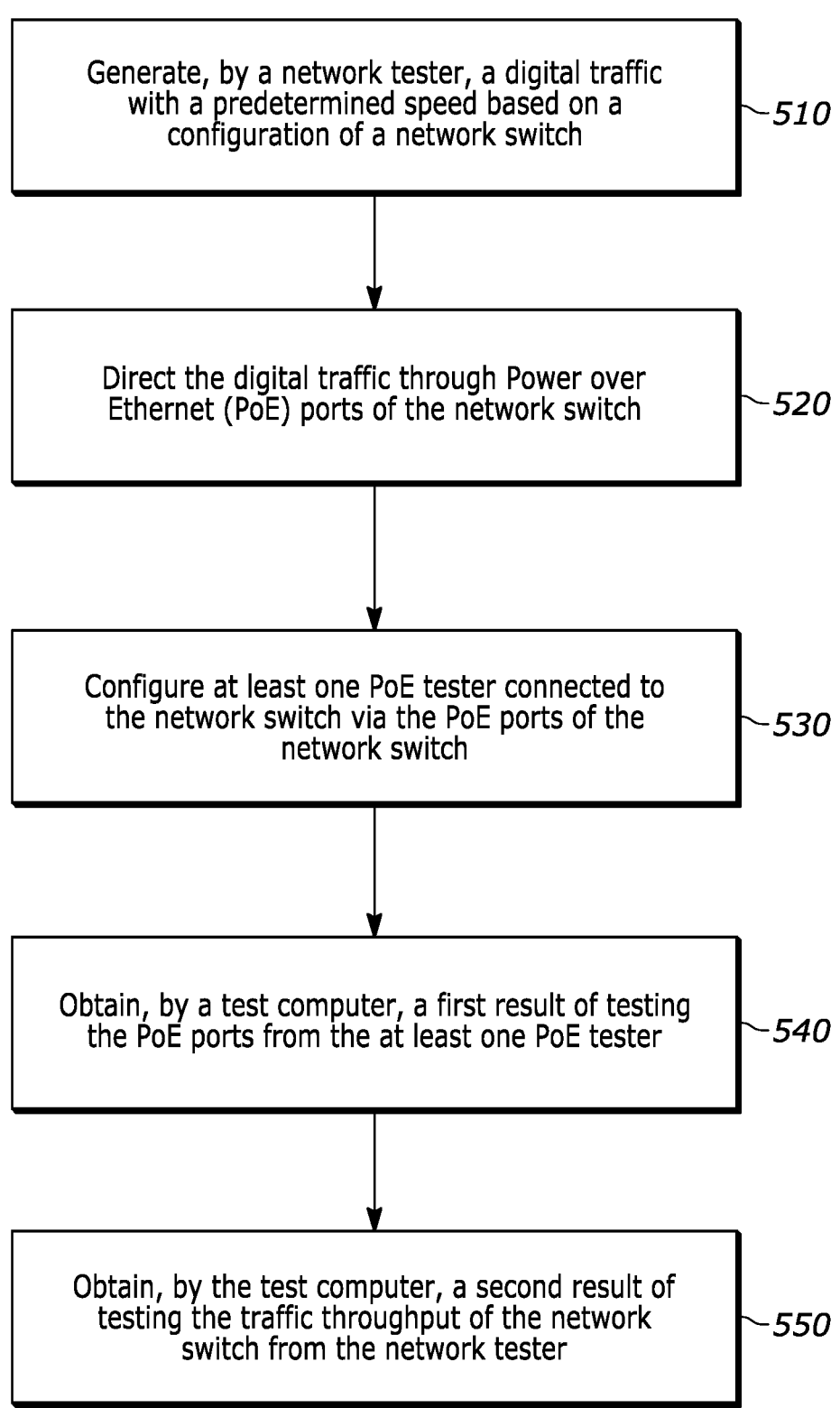

Generate, by a network tester, a digital traffic with a predetermined speed based on a configuration of a network switch ~ _510_

Direct the digital traffic through Power over Ethernet (PoE) ports of the network switch ~ _520_

Configure at least one PoE tester connected to the network switch via the PoE ports of the network switch ~ _530_

Obtain, by a test computer, a first result of testing the PoE ports from the at least one PoE tester ~ _540_

Obtain, by the test computer, a second result of testing the traffic throughput of the network switch from the network tester ~ _550_

FIG. 5

SYSTEMS AND METHODS FOR AUTOMATICALLY TESTING A NETWORK SWITCH

CROSS-REFERENCE TO RELATED APPLICATIONS

This application is a National Stage Application, filed under 35 U.S.C. 371, of International Patent Application No. PCT/US2022/048929, filed on 4 Nov. 2022, which claims priority to U.S. Provisional Application No. 63/275,672 filed 4 Nov. 2021, the entireties of which are incorporated herein by reference.

FIELD

The present disclosure generally relates to systems and methods for automatically testing a network switch, and more specifically, to systems and methods for automatically and simultaneously testing Power over Ethernet (POE) ports and traffic throughput of a network switch.

BACKGROUND

A network switch is networking hardware that connects devices on a computer network by using packet switching to receive and forward data to the destination device. A network switch is a multiport network bridge that forwards data at the data link layer (layer 2) and/or at the network layer (layer 3). As with any other device, a network switch needs to be tested to determine operability. As the number of ports and traffic speed on network switches keep increasing, testing a network switch is not only complicated, but also time consuming and expensive.

Summary

An object of the present disclosure, among others, is to provide systems and methods to automatically and simultaneously test Power over Ethernet (PoE) ports and traffic throughput of a network switch.

In one embodiment, a method for automatically and simultaneously testing PoE ports and traffic throughput of a network switch is disclosed. A data traffic is generated by a network tester with a predetermined speed based on a configuration of the network switch. The data traffic is directed through the PoE ports of the network switch. At least one PoE tester connected to the network switch via the PoE ports of the network switch is configured, e.g. by a test application running on a test computer. A first result of testing the PoE ports is obtained by the test computer from the at least one PoE tester. A second result of testing the traffic throughput of the network switch is obtained by the test computer from the network tester.

In another embodiment, a system for automatically and simultaneously testing PoE ports and traffic throughput of a network switch is disclosed. The system comprises: a network tester configured for generating a data traffic with a predetermined speed based on a configuration of the network switch; at least one PoE tester connected to the network switch via the PoE ports of the network switch; and a test computer configured for: directing the data traffic through the PoE ports of the network switch, obtaining a first result of testing the PoE ports from the at least one PoE tester, and obtaining a second result of testing the traffic throughput of the network switch from the network tester.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 5 is a flow chart showing an exemplary method for automatically and simultaneously testing PoE ports and traffic throughput of a network switch, in accordance with some embodiments of the present disclosure.

DETAILED DESCRIPTION

Figure 1:
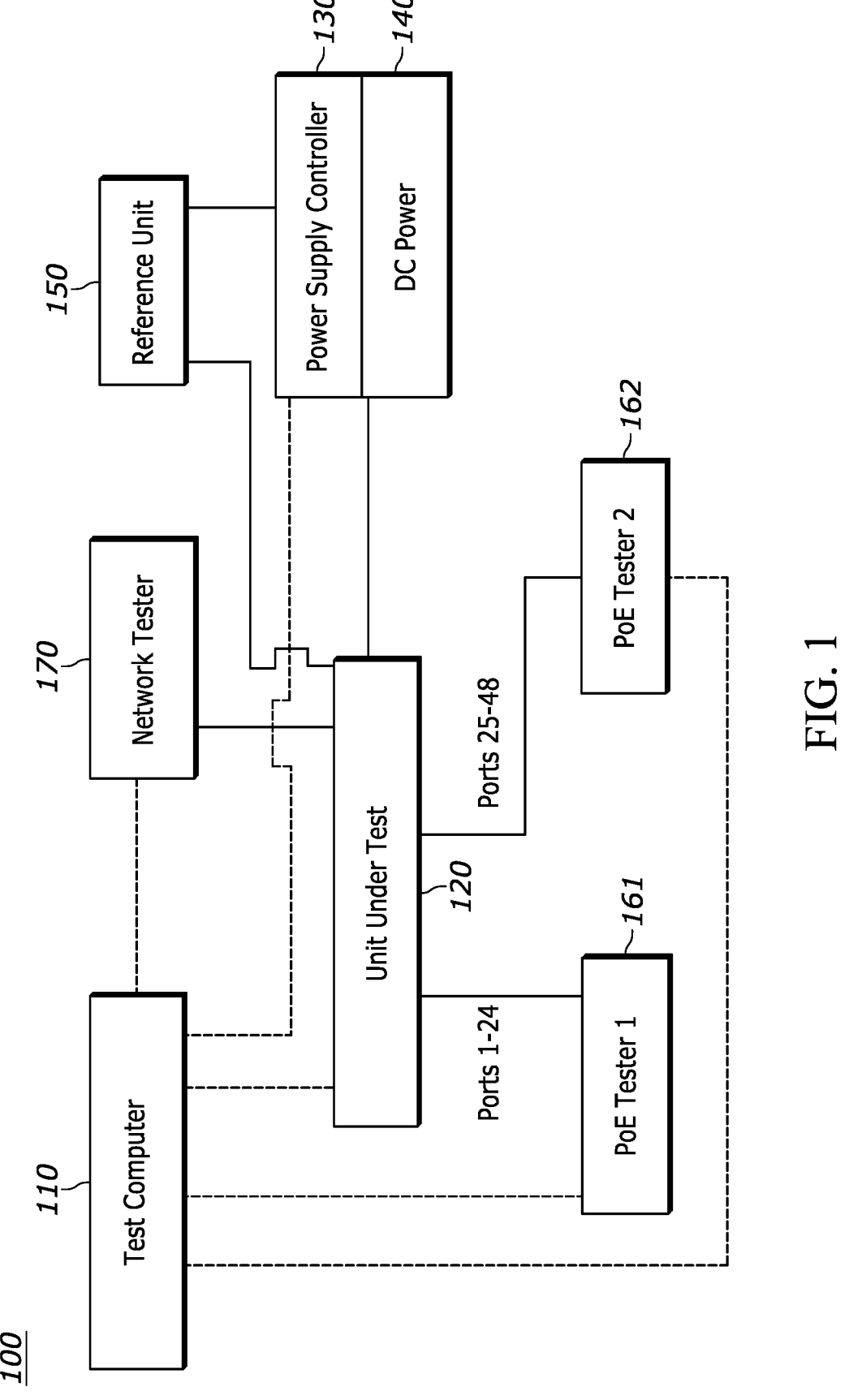
FIG. 1 is a block diagram of an exemplary system for automatically testing a network switch, in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "vertically," "downwardly," "upwardly," etc.) should be construed to refer to the orientation as then described or as shown in the drawing under discussion. These relative terms are for convenience of description and do not require that the apparatus be constructed or operated in a particular orientation.

Various embodiments of the present disclosure provide methods and systems for automatically and simultaneously testing Power over Ethernet (PoE) ports and traffic through-put of a network switch. The system may comprise a test application or software that interacts with and controls the network switch for testing. The test application or software may be custom-configurable to accommodate for different hardware setups.

In some embodiments, a disclosed system has the ability to test network switches up to 100G speeds, and has a capability to test 48 PoE ports simultaneously while data traffic is being passed through the network switch under test. In some embodiments, the disclosed system may also incorporate an automated power supply controller which has the ability to measure the power, current, and voltage being drawn by the network switch under test as well as the ability to power cycle the network switch. In some embodiments, the disclosed method for automatically testing the network switch is implemented by a software package or test application running on a computer.

In some embodiments, multiple functionalities of the network switch are tested simultaneously and automatically to save time and cost. For example, PoE ports of the network switch can be tested while data traffic throughput of the network switch is tested as well. In some embodiments, a virtual local area network (VLAN) routing method is configured for routing data through the PoE ports of the network switch to test the data traffic throughput of the network switch, when PoE ports are tested at the same time.

FIG. 1 shows a block diagram of an exemplary system 100 for automatically testing a network switch, in accordance with some embodiments of the present disclosure. The system 100, as shown in FIG. 1, comprises a test computer 110, a unit under test (UUT) device 120, a power supply controller 130, a direct current (DC) power supply 140, a reference unit 150, PoE testers 161, 162, and a network tester 170.

The test computer 110 in this example may be any computer including a processor and a memory storing a test application. Examples of the test computer 110 may include a personal computer (PC), laptop, tablet, smartphone, etc. As shown in FIG. 1, the test computer 110 is connected to the UUT 120, the power supply controller 130, the PoE testers 161, 162, and the network tester 170. In some embodiments, the test application running on the test computer 110 can communicate with all the other components in the system 100 and provide a GUI which is what a user or technician can interact with.

The UUT device 120 in this example can be any device to be tested. For example, the UUT device 120 may be any network switch that can connect different devices on a computer network by using packet switching to receive and forward data to the destination device. It is desirable to test PoE ports and traffic throughput of the UUT device 120. In some embodiments, a traffic throughput of a network switch, or any other network device, can be tested by passing a set of known data packets with certain data rate through the network switch to see whether there is any error or whether the error rate is below a certain threshold. A PoE port is a port through which the network switch can provide electric power via Ethernet cabling, other than or in addition to providing Ethernet data, to network devices like computer, printer, laptop, phone, tablet, web camera, etc. A network device connecting the PoE port of the network switch via an Ethernet cable can receive electric power and Ethernet data at the same time, without a need of a power cord.

In some embodiments, a PoE port can be tested to determine a maximum current and voltage the PoE port can handle, or whether the PoE port can support or provide a certain current or voltage according to a predetermined specification. A PoE port of a network switch can perform two functions, providing electric power and Ethernet data, at the same time. As such, testing the current/voltage and data throughput of the PoE ports simultaneously is a test simulating a practical implementation of the network switch.

The power supply controller 130 is configured for controlling the DC power supply 140 and/or an alternating current (AC) power supply (not shown in FIG. 1) to provide electric power to the UUT 120 and the reference unit 150. In some embodiments, the UUT device 120, as well as the reference unit 150, can be powered by AC and/or DC power supplies. In some embodiments, the power supply controller 130 may be an AC power strip that can be controlled by the test application running on the test computer 110. One purpose of the power supply controller 130 is to toggle the power ports in a certain sequence to automate testing of the power supplies of the UUT 120. In some embodiments, the power supply controller 130 has the ability to measure the power, current, and voltage being drawn by the UUT 120 as well as the ability to power cycle the UUT 120, e.g. following commands received from the test application running on the test computer 110. The test application may turn the ports on and off on the power supply controller 130 in a particular order and then queries the UUT 120 if the UUT 120 is still active.

The reference unit 150 in this example is a similar unit to the UUT 120 and has similar stacking ports that are connected to the UUT 120. The reference unit 150 can ensure the stacking ports (if present) on the UUT 120 can be tested.

Each of the PoE testers 161, 162 can provide a load for a network switch that has PoE enabled ports in order to ensure all ports can provide the maximum current simultaneously based on the specifications of the switch network, during the test of the network switch. In one example, each of the PoE testers 161, 162 are connected to 24 PoE enabled ports of the UUT 120, which may be a network switch has up to 48 ports. For each additional 24 PoE enabled ports to be tested simultaneously, an additional PoE tester will be added to the system 110 with an update of the test application on the test computer 110.

The network tester 170 in this example can generate a digital traffic at a speed up to a 100GigE. The actual speed of the data traffic generated may be based on what the UUT 120 is rated at. In some embodiments, the speed of the data traffic generated is equal to a maximum speed of a slowest port on the network switch. The data traffic can be used to test that when the traffic flows at the speed through the UUT 120, whether any packets are dropped or corrupted during the test. In another embodiment, the data traffic can be used to determine a maximum speed for the traffic to flow through the UUT 120 with no packet dropped or corrupted during the test. Due to a snake-like virtual local area network (VLAN) approach utilizing a loopback adapter, the system 100 can test a network switch having any number of ports, however large the number is.

Figure 2A:
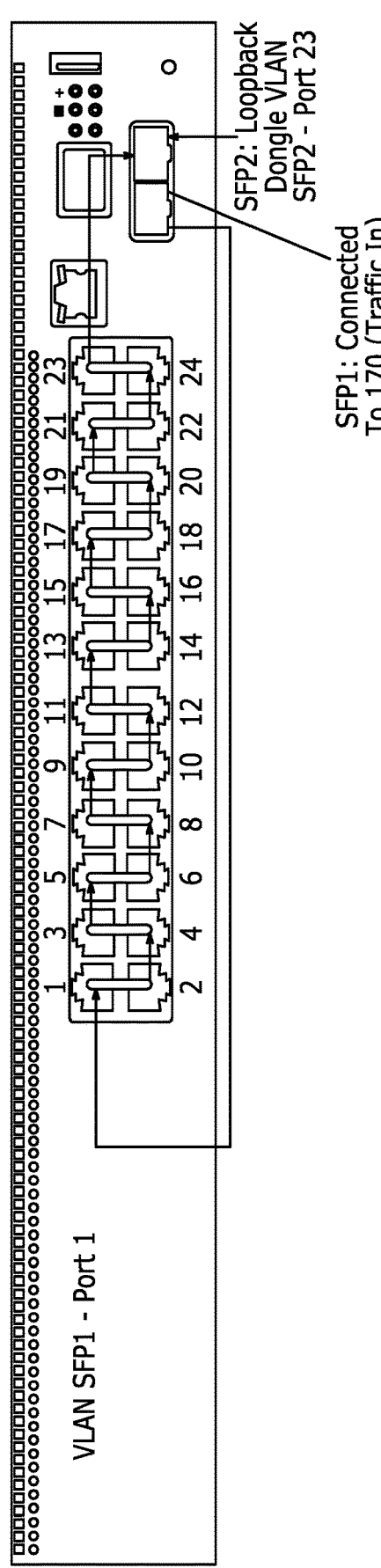
FIGS. 2A and 2B show an exemplary virtual local area network (VLAN) routing method for routing data through PoE ports of a network switch, in accordance with some embodiments of the present disclosure.
Figure 2B:
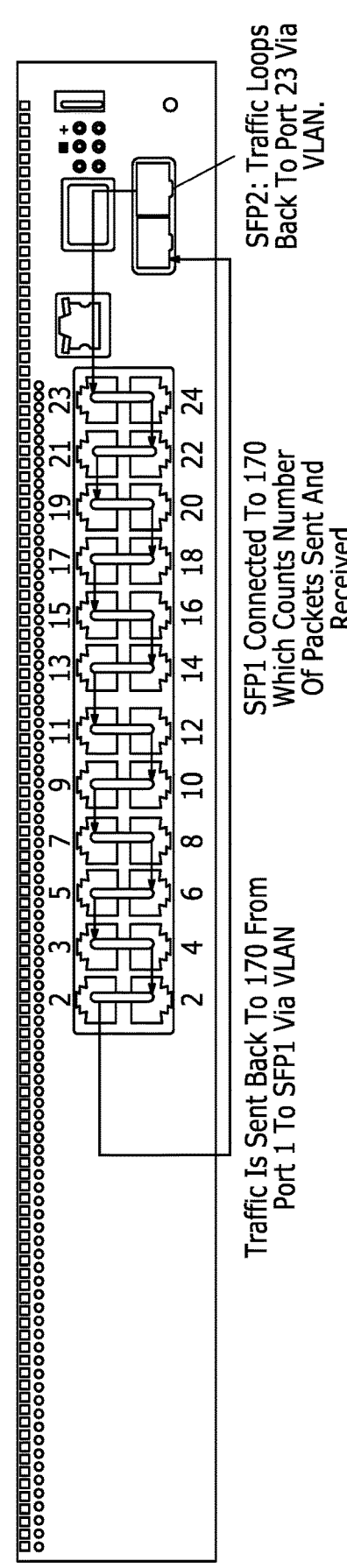

VLAN is a routing method to direct traffic on the ports of a network switch, e.g. based on commands from the test computer 110 through a command line interface (CLI) connected between the test computer 110 and the network switch 120 which is the UUT device in one example. FIGS. 2A and 2B show an exemplary VLAN routing method for routing data through PoE ports of a network switch 200, which may serve as the UUT device 120 in FIG. 1, in accordance with some embodiments of the present disclosure. As shown in FIG. 2A, the data traffic comes in at a first form-factor pluggable (SFP) port SFP1 from the network tester 170, e.g. via a cable (not shown in FIG. 2A) physically connecting the network tester 170 and the SFP1 port of the network switch 200. The data may then be routed from the SFP1 port to PoE port 1 based on the VLAN routing method via a configuration in the test application or software, without any cable physically connecting the PoE port 1 and the SFP1 port. In this example, the traffic then goes from port 1, to port 2, to port 4, to port 3, and all the way to port 23 following a zigzag pattern based on the VLAN route configured in the test application or software (and based on front loopback cables connecting two ports vertically adjacent to each other in some embodiments). The traffic may then go from the port 23 to a second SFP port SFP2 which contains a loopback dongle.

In some embodiments, as shown in FIG. 2B, the traffic is then looped back from port SFP2 to port 23; then goes from port 23, to port 24, to port 22, to port 21, and all the way back to port 1, based on the VLAN route configured in the test application or software. Then, the traffic is routed from port 1 back to port SFP1 based on the VLAN route, based on the VLAN route configured in the test application or software, without any cable physically connecting the PoE port 1 and the SFP1 port. Traffic then exits the network switch 200 and goes back to the network tester 170 via the cable (not shown in FIG. 2B) physically connecting the network tester 170 and the SFP1 port of the network switch 200. In some embodiments, the network tester 170 can count the number of packets sent and received to determine whether there is any packet dropped or corrupted during the traffic test. In some embodiments, the network tester 170 can determine which one or more of the ports 1-24 in the network switch 200 dropped a data packet, since the counters of the network switch 200 and/or the network tester 170 are cleared before the test. For example, after determining that one of the sent data packets was lost, the network tester 170 can determine the data packet was dropped first in which one of the PoE ports 1-24 in the network switch 200.

In some embodiments, while the ports 1-24 of the network switch 200 are PoE enabled, the ports SFP1 and SFP2 are not PoE enabled. Each of the ports 1-24 of the network switch 200 may be connected to a respective port on a PoE tester, e.g. the PoE tester 1 161. As such, the PoE tester can test the PoE enabled ports 1-24 at the same time when the network tester 170 is testing the data throughput of the network switch 200 via the VLAN routing.

Figure 3A:
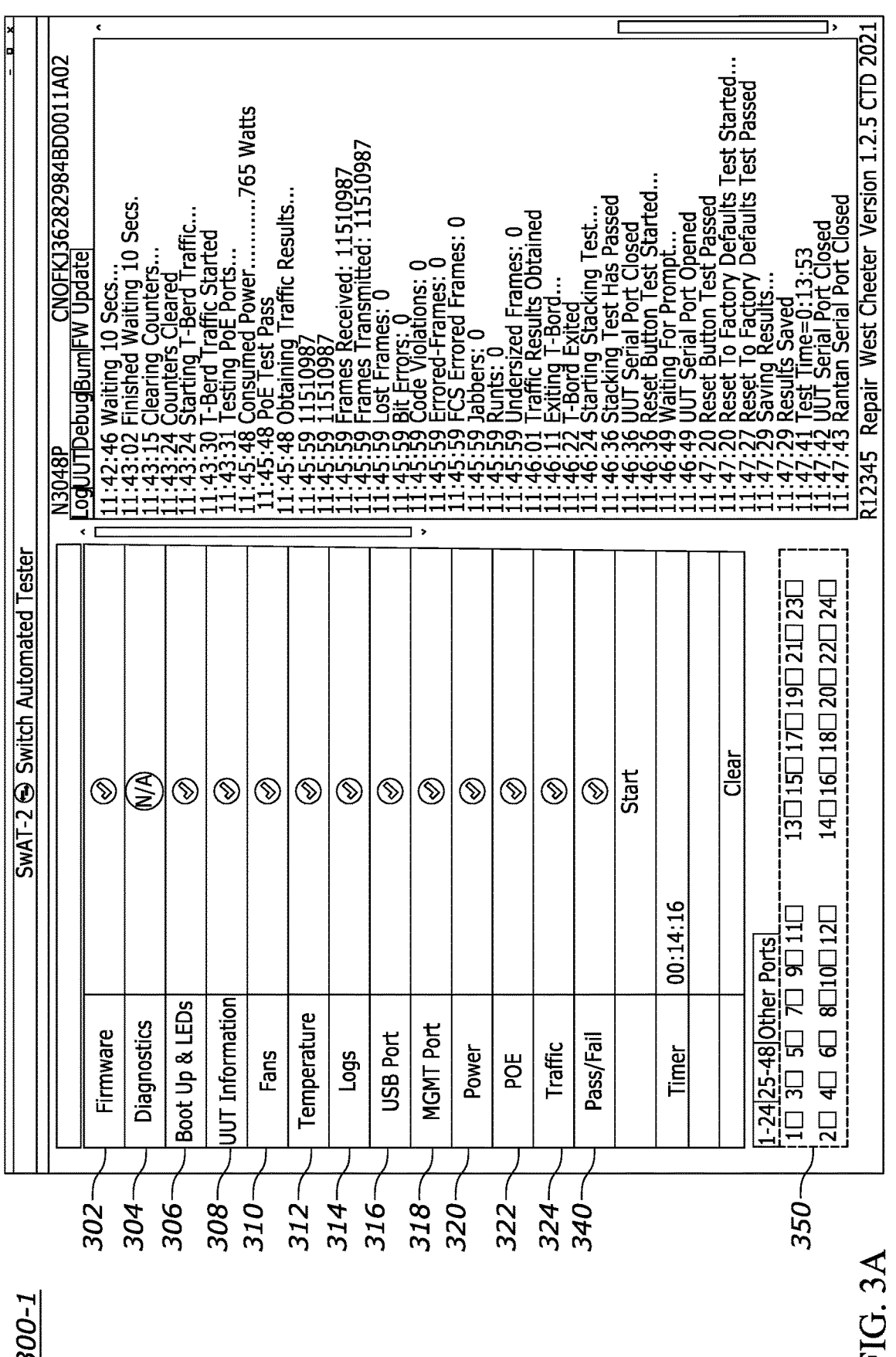
FIGS. 3A and 3B show an exemplary graphical user interface (GUI) of a system for automatically testing a network switch, in accordance with some embodiments of the present disclosure.
Figure 3B:
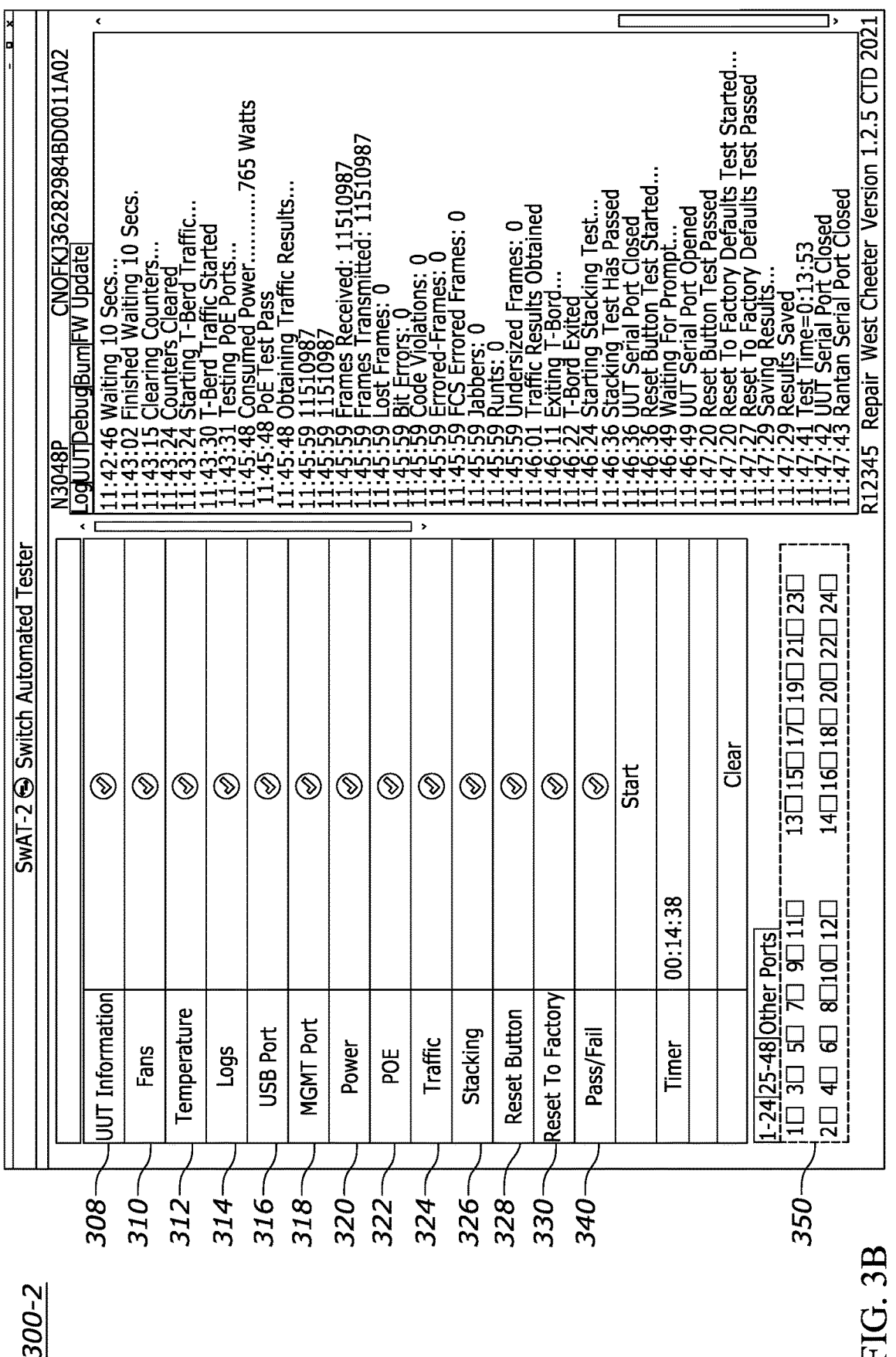

In some embodiments, the test application running on the test computer 110 may be designed to test any network switch according to the standard a customer requests. FIGS. 3A and 3B show an exemplary graphical user interface (GUI) 300 of a system for automatically testing a network switch based on the test application, in accordance with some embodiments of the present disclosure. As shown in FIG. 3A, the GUI 300-1 displays results by automatically testing a network switch.

The firmware 302 may be tested because the test application can query the UUT 120 via the Command Line Interface (CLI) to see if the UUT 120 is running at the firmware level as expected. A CLI is a main communication bus between the test computer that runs the test application and the UUT device 120. If the UUT 120 is not running at the firmware level as expected, the appropriate firmware and complex programmable logic devices (CPLDs) embedded in the UUT 120 are programmed. In some embodiment, the firmware 302 can be upgraded by the test application automatically.

Because some higher end switches have an on-board diagnostics tool, the test application can communicate with the UUT 120 via the CLI and issue commands to run the diagnostics 304 and ensures each test is a pass.

In the test for Boot Up and LEDs 306, the test application waits for the UUT 120 to boot to a known prompt command or instruction by monitoring the CLI. Then the user is prompted and instructed to ensure the LEDs are all working.

In the test of the UUT information 308, the test application queries the UUT 120 for its serial number and several other metrics and then checks whether the serial number the technician enters matches the one the UUT has stored on its memory or storage.

In the tests of the Fans 310 and Temperature 312, the test application queries the UUT 120 for its fans and temperature status. If the string "good" is found at the appropriate places, then the test is deemed a pass.

In the test of Logs 314, the test application sends commands via CLI to erase all logs that may be stored on the UUT 120.

In the test of universal serial bus (USB) port 316, the test application queries the UUT 120 via CLI to see if a USB dongle has been placed in the USB port on the UUT.

In the test of management (MGMT) port 318, the test application utilizes the CLI port on the network switch to configure the MGMT port and send a ping to the test computer 110.

Because network switches can utilize a variety of AC and DC power supplies, in the test of Power 320, the test application turns the ports on and off on the power supply controller 130 in a particular order and then queries the UUT 120 via the CLI if the unit is still active.

The tests of the PoE ports 322 and data traffic 324 will be described in detail below referring to FIG. 4 and FIG. 5. While FIGS. 3A and 3B show test results for ports 1-24 350 of the UUT 120, test results for ports 25-48 of the UUT 120, if applicable, can be shown on the GUI 300 upon user selection via the GUI 300.

The GUI 300-2 in FIG. 3B shows additional results by automatically testing the network switch.

Some switches have stacking ports which are separate ports on the rear of them that are connected to a similar switch, e.g. the reference unit 150. In the test of stacking 326, the test application can use the CLI to query the UUT 120 whether it can see the reference unit 150 on each stacking port or not. The stacking test passes if the UUT 120 can see the reference unit 150 on each stacking port.

Some switches have reset buttons. The test of reset button 328 can prompt the user to push the reset button. Then the test application will monitor the CLI of the UUT 120 to ensure the UUT 120 reboots successfully.

Each network switch has a way of setting the network switch back to its factory defaults via the CLI. In the test of Reset to Factory 330, the test application can send commands to the UUT via the CLI and monitor the CLI to ensure the UUT has been successfully reset. The Pass/Fail indication 340 indicates whether the entire test for the network switch passes or fails. If any of the above described tests in FIG. 3A and FIG. 3B fails, the indication 340 indicates a fail. If all of the above described tests in FIG. 3A and FIG. 3B pass, the indication 340 indicates a pass FIG. 4 is a flow chart showing an exemplary method 400 for automatically testing a network switch, in accordance with some embodiments of the present disclosure. In some embodiments, the method 400 may be implemented via the test application running on the test computer 110, to test PoE ports and traffic throughput simultaneously of the network switch.

Figure 4:
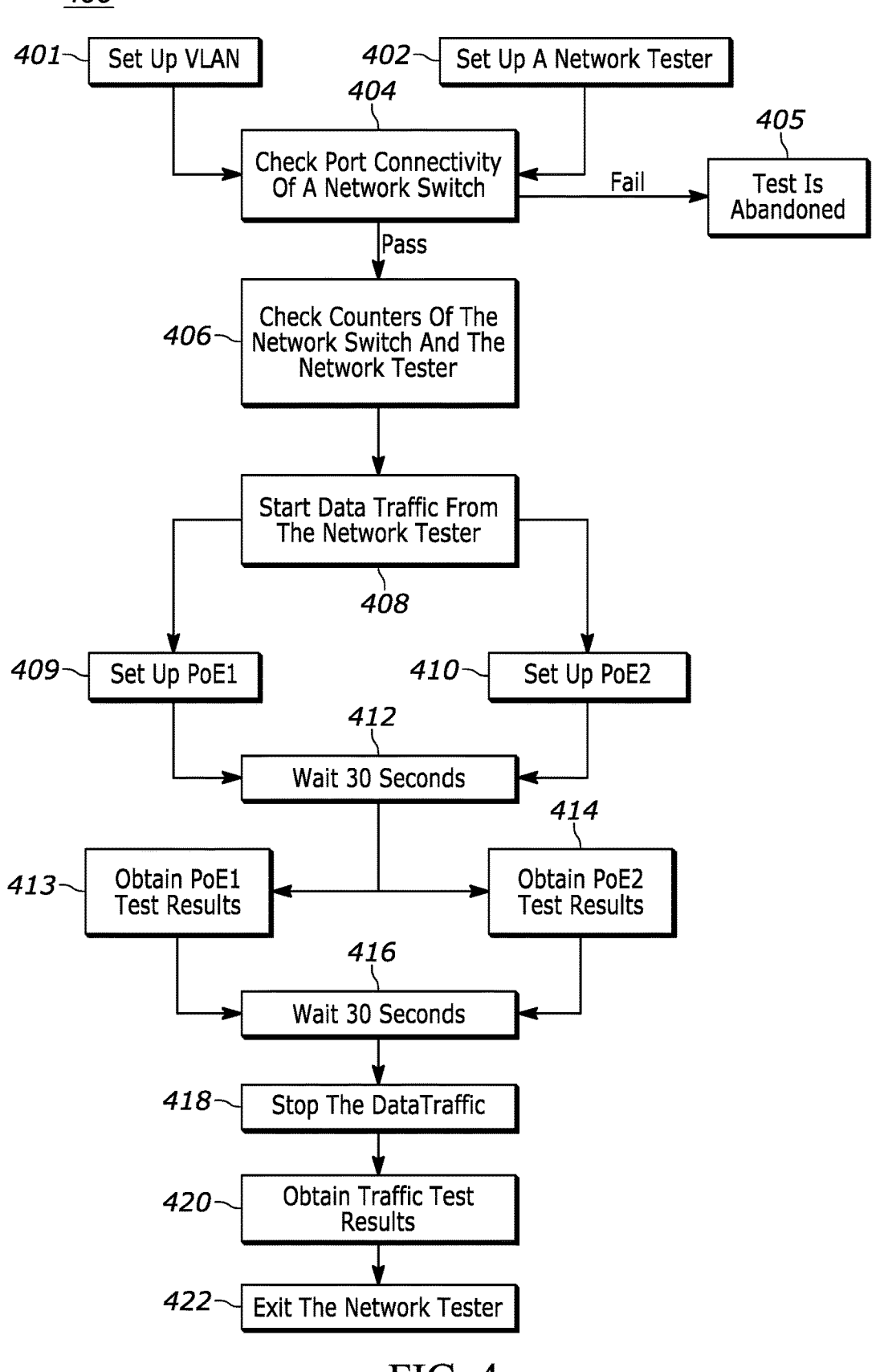
FIG. 4 is a flow chart showing an exemplary method for automatically testing a network switch, in accordance with some embodiments of the present disclosure.

As shown in FIG. 4, the method 400 starts from operations 401 and 402, where the VLAN routing method and the network tester (e.g. the network tester 170) are configured or set up respectively and simultaneously, at the test application or software. The VLAN routing method may be used for routing data through the PoE ports of the network switch based on commands sent from the test application on the test computer to the network switch via a CLI connected between the test computer and the network switch.

Then at operation 404, the port connectivity of the network switch is checked to determine whether the PoE ports of the network switch are connected. If it is determined that any PoE port of the network switch is disconnected, the user will be notified that which port(s) are not connected and instructed to ensure the corresponding cable(s) are plugged into said port(s) properly. If this does not solve the issue, the tests may be abandoned for the network switch. If it is determined that the PoE ports of the network switch are connected, the method goes to operation 406, where counters of the network switch and the network tester are cleared.

Then at operation 408, a data traffic is generated by the network tester and directed through the PoE ports of the network switch, e.g. by routing the traffic through each PoE port of the network switch sequentially following the VLAN routing method.

Then at operations 409 and 410, two PoE testers are configured respectively at the test application or software, and they are pre-connected to the network switch via the PoE ports of the network switch. In other embodiments, other numbers of PoE testers may be used to connect to the network switch based on the number of PoE ports of the network switch.

To ensure the PoE testers are configured at operations 409 and 410, the test application may wait for a predetermined time period, e.g. 30 seconds, at operation 412, and then obtain PoE test results of testing the PoE ports of the network switch from the two PoE testers respectively at operations 413, 414. In some examples, when only one PoE tester is needed to test the PoE ports, there would be no operations 410, 414.

After obtaining the PoE test results, the test application may wait for a predetermined time period, e.g. 30 seconds, at operation 416 to ensure the data traffic has gone through all desired ports of the network switch, and then stop the data traffic at operation 418. Then at operation 420, the test application may obtain a traffic test result of testing the traffic throughput of the network switch, e.g. from the network tester. The test application may then exit the network tester at operation 422. As such, the disclosed method 400 can test PoE ports and traffic throughput simultaneously of the network switch. There is no need to plug or unplug any cable during or between the tests.

FIG. 5 is a flow chart showing an exemplary method 500 for automatically and simultaneously testing PoE ports and traffic throughput of a network switch, in accordance with some embodiments of the present disclosure. In some embodiments, the method 500 may be implemented via the test application running on the test computer 110, to test PoE ports and traffic throughput simultaneously of the network switch. At operation 510, a data traffic is generated by a network tester with a predetermined speed based on a configuration of the network switch. At operation 520, the data traffic is directed through the PoE ports of the network switch. At operation 530, at least one PoE tester connected to the network switch via the PoE ports of the network switch is configured. At operation 540, a first result of testing the PoE ports is obtained by a test computer from the at least one PoE tester. At operation 550, a second result of testing the traffic throughput of the network switch is obtained from the test computer from the network tester. The order of the operations in FIG. 4 and FIG. 5 may be changed (or multiple operations happen at the same time) according to various embodiments of the present teaching.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, Phablet, PDA, smartphone, or wearable technology The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device, smartphone or tablet. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a mobile smartphone, a personal digital assistant (PDA), tablet, a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Although examples are illustrated and described herein, embodiments are nevertheless not limited to the details shown, since various modifications and structural changes may be made therein by those of ordinary skill within the scope and range of equivalents of the claims.

The invention claimed is:

1. A method for automatically and simultaneously testing Power over Ethernet (POE) ports and traffic throughput of a network switch, comprising:
   configuring, by a test computer, a network tester;
   configuring, by the test computer, a virtual local area network (VLAN) routing method for routing data through the PoE ports of the network switch based on commands sent from the test computer to the network switch via a command line interface (CLI) connected between the test computer and the network switch;
   generating, by the network tester, a data traffic with a predetermined speed based on a configuration of the network switch;
   directing the data traffic through the PoE ports of the network switch;
   configuring at least one PoE tester connected to the network switch via the PoE ports of the network switch;
   obtaining, by a test computer, a first result of testing the PoE ports from the at least one PoE tester; and
   obtaining, by the test computer, a second result of testing the traffic throughput of the network switch from the network tester.

2. The method of claim 1, wherein the data traffic is directed through the PoE ports of the network switch by:
   routing the data traffic through each PoE port of the network switch sequentially following the VLAN routing method.

3. The method of claim 1, wherein the data traffic is directed through the PoE ports of the network switch by:

routing the data traffic through each PoE port of the network switch twice following the VLAN routing method.

4. The method of claim 1, further comprising:
   determining whether the PoE ports of the network switch are connected;
   upon determining that any PoE port of the network switch is disconnected, abandoning the tests of the PoE ports and the traffic throughput; and
   upon determining that the PoE ports of the network switch are connected, clearing counters of the network switch and the network tester before generating the data traffic.

5. The method of claim 1, wherein the first result is obtained at least a predetermined time period after configuring the at least one PoE tester.

6. The method of claim 1, wherein:
   the second result is obtained after the data traffic through the PoE ports of the network switch is stopped; and
   the data traffic is stopped at least a predetermined time period after the first result is obtained.

7. A method for automatically and simultaneously testing Power over Ethernet (POE) ports and traffic throughput of a network switch, comprising:
   generating, by a network tester, a data traffic with a predetermined speed based on a configuration of the network switch;
   directing the data traffic through the PoE ports of the network switch;
   configuring at least one PoE tester connected to the network switch via the PoE ports of the network switch;
   wherein
   configuring the at least one PoE tester connected to the network switch via the PoE ports of the network switch comprises configuring a plurality of PoE testers connected to the network switch via the PoE ports of the network switch;
   the plurality of PoE testers has a first quantity; and
   the PoE ports of the network switch has a second quantity which is a multiple of the first quantity
   obtaining, by a test computer, a first result of testing the PoE ports from the at least one PoE tester; and
   obtaining, by the test computer, a second result of testing the traffic throughput of the network switch from the network tester.

8. The method of claim 7, wherein the data traffic is directed through the PoE ports of the network switch by:
   routing the data traffic through each PoE port of the network switch sequentially following the VLAN routing method.

9. The method of claim 8, wherein the data traffic is directed through the PoE ports of the network switch by:
   routing the data traffic through each PoE port of the network switch twice following the VLAN routing method.

10. The method of claim 7, further comprising:
   determining whether the PoE ports of the network switch are connected;
   upon determining that any PoE port of the network switch is disconnected, abandoning the tests of the PoE ports and the traffic throughput; and
   upon determining that the PoE ports of the network switch are connected, clearing counters of the network switch and the network tester before generating the data traffic.

11. The method of claim 7, wherein the first result is obtained at least a predetermined time period after configuring the at least one PoE tester.

12. The method of claim 7, wherein:

the second result is obtained after the data traffic through the PoE ports of the network switch is stopped; and the data traffic is stopped at least a predetermined time period after the first result is obtained.

13. A system for automatically and simultaneously testing Power over Ethernet (POE) ports and traffic throughput of a network switch, comprising:

a network tester configured for generating a data traffic with a predetermined speed based on a configuration of the network switch;

an additional switch that is connected to the network switch via at least one stacking port of the network switch, wherein the at least one stacking port is separate from the PoE ports;

at least one PoE tester connected to the network switch via the PoE ports of the network switch;

a test computer configured for:

directing the data traffic through the PoE ports of the network switch, obtaining a first result of testing the PoE ports from the at least one PoE tester, and obtaining a second result of testing the traffic throughput of the network switch from the network tester; and a power supply controlled by a test application on the test computer to provide an electric power to both the network switch and the additional switch.

\* \* \* \* \*